Nov. 22, 1955
C. T. HATCH ET AL
2,724,486
CONVEYOR SYSTEM FOR ADVANCING AND
DIVIDING A SERIES OF ARTICLES
Filed May 13, 1954
4 Sheets-Sheet 1
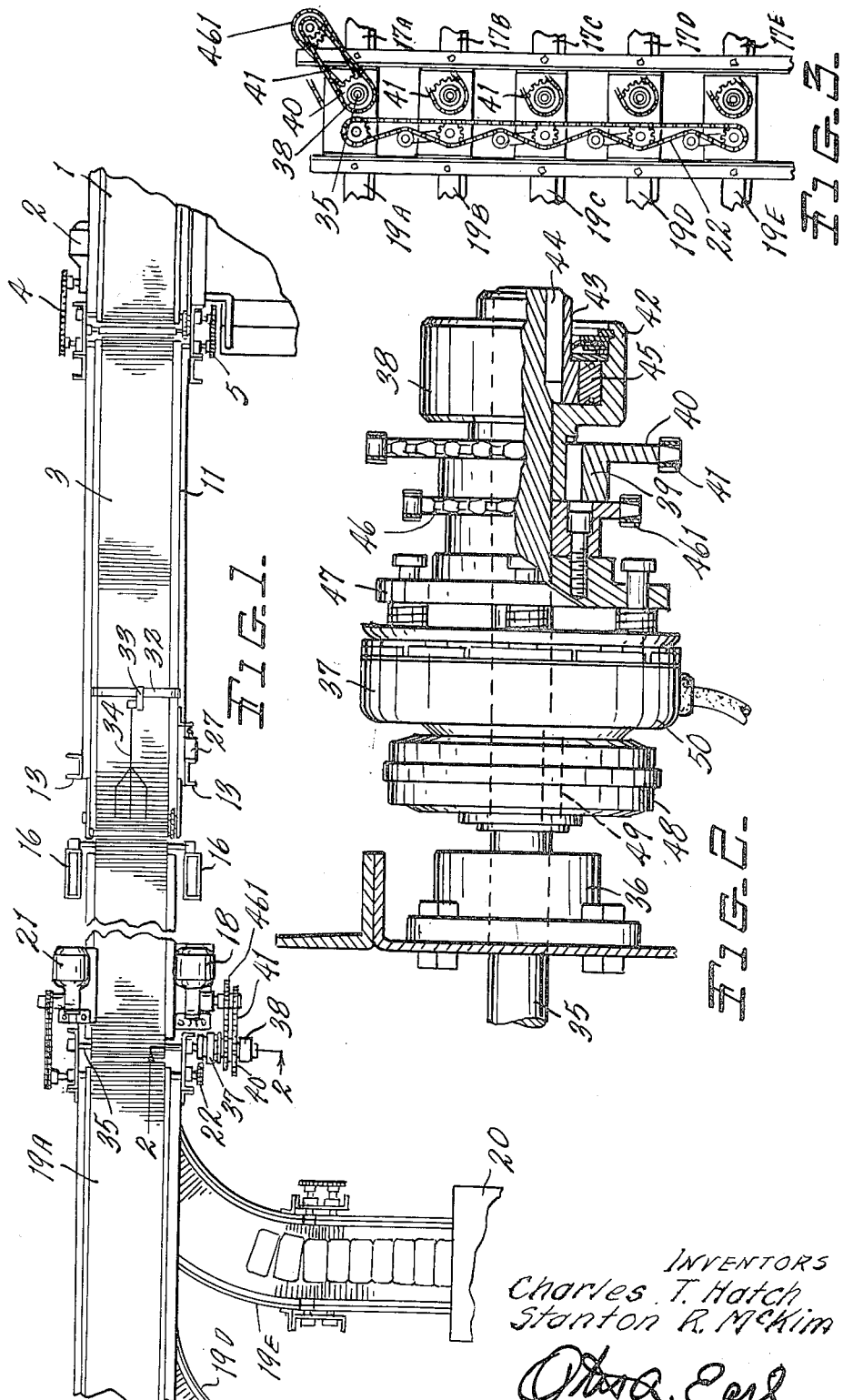
INVENTORS
Charles T. Hatch
Stanton R. McKim
BY Otto A. Earl
Attorney.

Nov. 22, 1955
C. T. HATCH ET AL
2,724,486
CONVEYOR SYSTEM FOR ADVANCING AND
DIVIDING A SERIES OF ARTICLES
Filed May 13, 1954
4 Sheets-Sheet 2
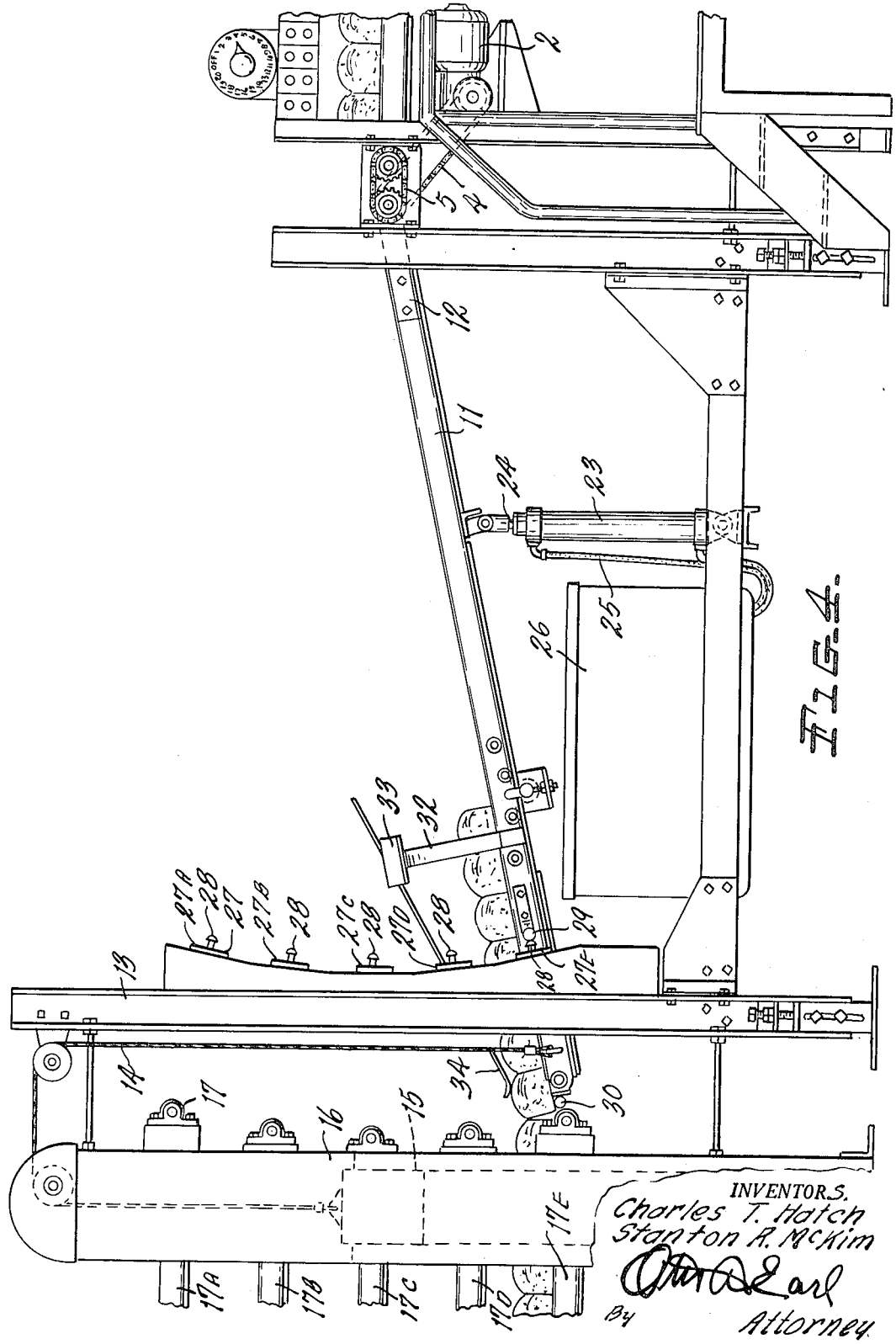
FIG. 4.
INVENTORS.
Charles T. Hatch
Stanton R. McKim
By Attorney

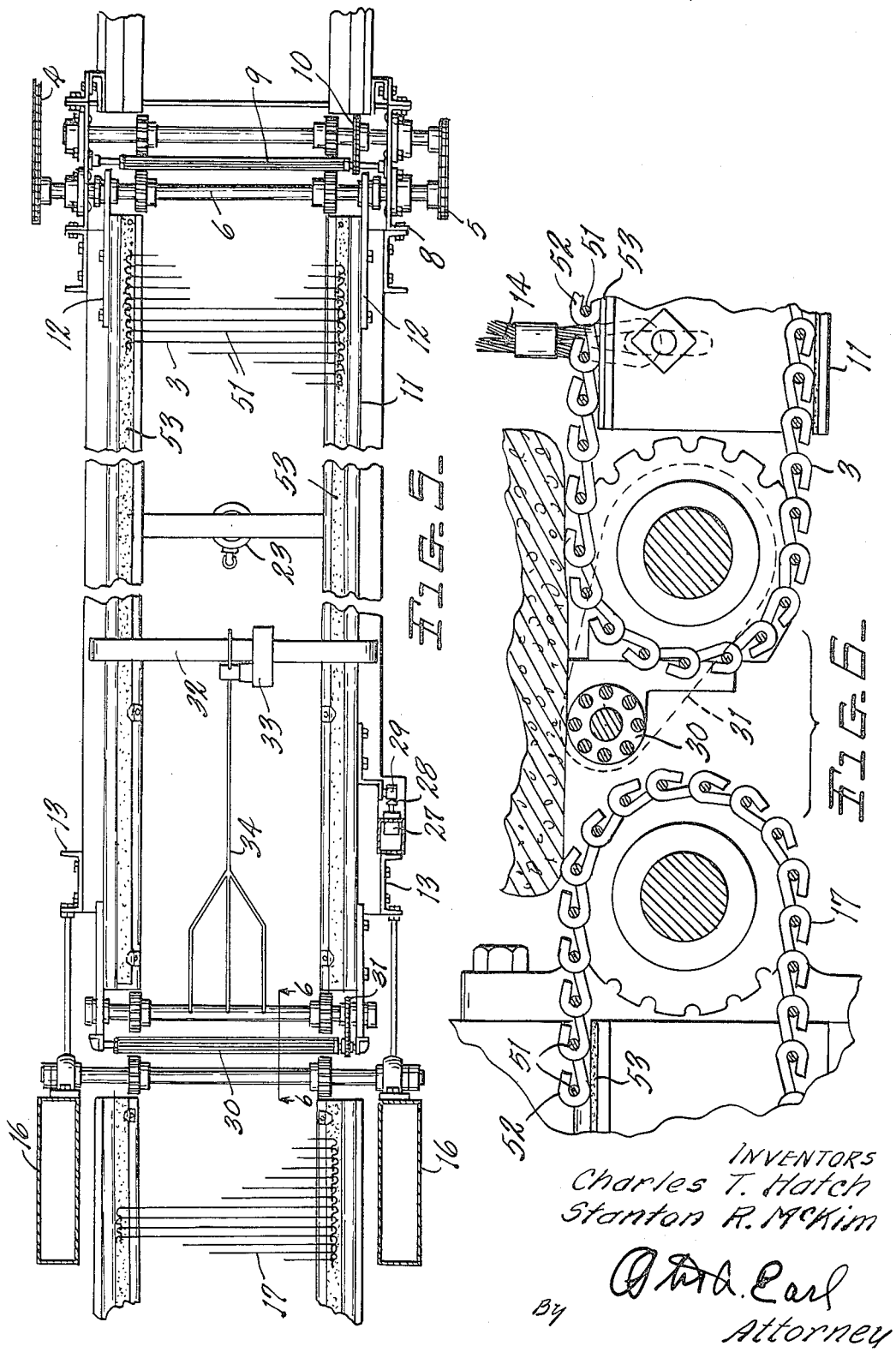

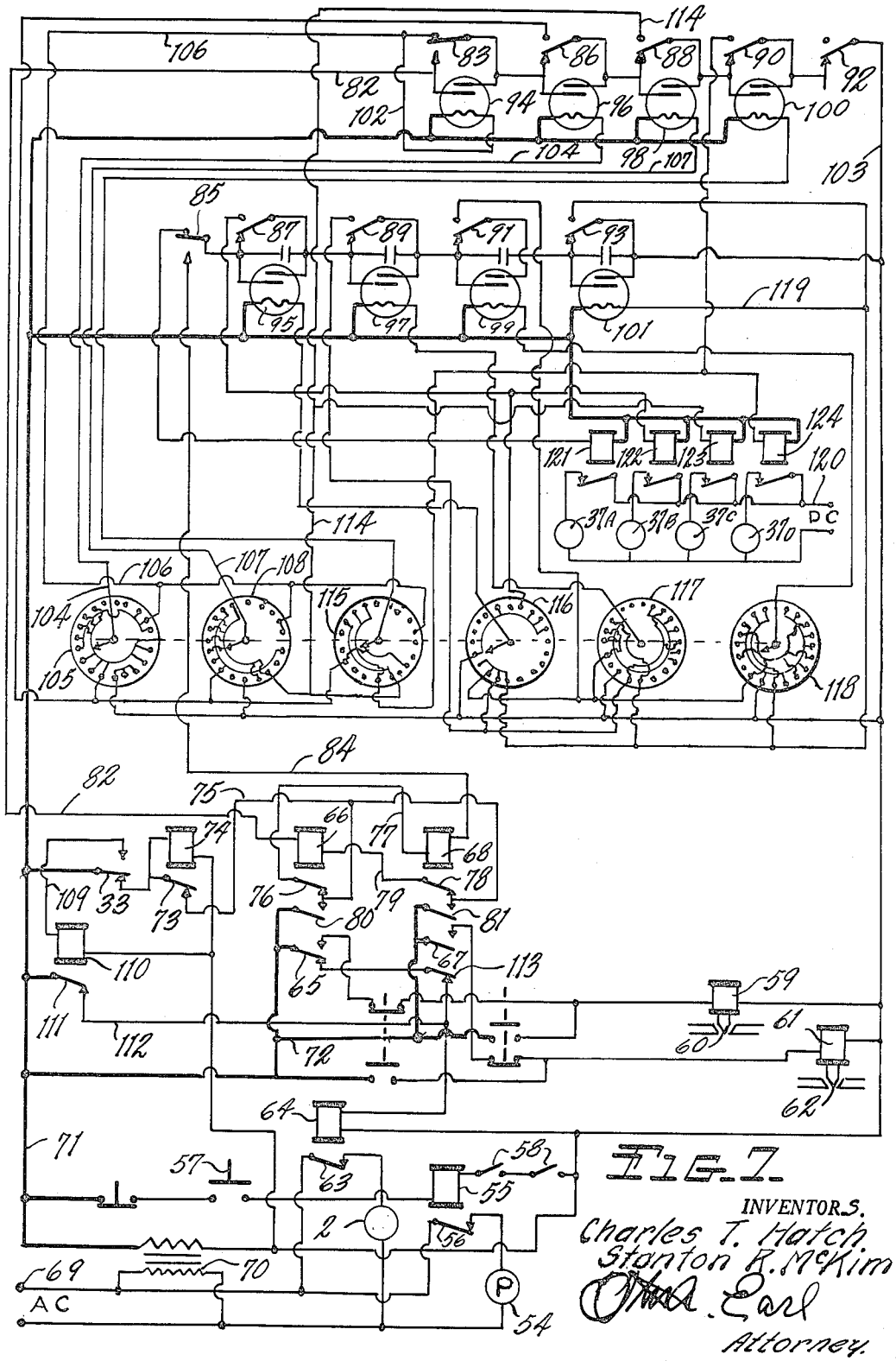

United States Patent Office 2,724,486
Patented Nov. 22, 1955

2,724,486

CONVEYOR SYSTEM FOR ADVANCING AND DIVIDING A SERIES OF ARTICLES

Charles Thatcher Hatch and Stanton R. McKim, Albion, Mich., assignors to Union Steel Products Company, Albion, Mich.

Application May 13, 1954, Serial No. 429,425

9 Claims. (Cl. 198—31)

This invention relates to improvements in conveyor system for advancing and dividing a series of articles.

The principal objects of this invention are:

First, to provide a system particularly adapted for rapidly advancing loaves of bread from a cooler to a plurality of slicing and wrapping machines so as to equally divide the output of the cooler between selected groups of the slicing machines.

Second, to provide a conveyor system for rapidly advancing a series of articles and dividing the series between a plurality of conveyors operated at a relatively slow speed.

Third, to provide a conveyor system that will transfer relatively fragile articles such as loaves of bread from a relatively rapidly moving delivery conveyor to a plurality of relatively slowly moving receiving conveyors without subjecting the articles to shock or abrasion as the articles are decelerated.

Fourth, to provide a novel control system for a selector conveyor swingable between a plurality of receiving conveyors to control movement of the selector conveyor in response to movement of groups of articles along the selector conveyor.

Fifth, to provide a control system for a swingable selector conveyor that will not actuate the selector conveyor when the control system is accidentally energized by stray articles moving along the selector conveyor separately from organized groups of articles.

Sixth, to provide a conveyor system and a control circuit therefor which is extremely effective in distributing bread from a cooler to different groups of slicing machines, the conveyor and control system being readily adjustable to vary the grouping of slicing machines to receive the bread.

Other objects and advantages of the invention will be apparent from a consideration of the following description and claims. The drawings of which there are four sheets illustrate a highly practical form of the conveyor and control system.

Fig. 1 is a fragmentary plan view of the conveyor system, portions of the conveyors being broken away.

Fig. 2 is a fragmentary side elevational view of the driving clutch connection to the receiving conveyors partially broken away in cross-section along the plane of the line 2—2 in Fig. 1.

Fig. 3 is a side elevational view of the driving connections to the forwarding conveyors.

Fig. 4 is an enlarged side elevational view of the selector conveyor and the adjacent portions of the receiving and delivery conveyors.

Fig. 5 is a fragmentary plan view of the selector conveyor.

Fig. 6 is an enlarged fragmentary cross-sectional view taken along the plane of the line 6—6 in Fig. 5, and illustrating the operative relationship between the adjacent ends of the selector conveyor and the receiving conveyors.

Fig. 7 is a schematic wiring diagram of the control system for regulating the operation of the conveyor system.

The present conveyor and control system are improvements on the conveyors and control system disclosed and claimed in the co-pending application of Charles T. Hatch and Stanton R. McKim, Serial Number 272,942, filed February 23, 1952, for Conveyor System for Advancing and Dividing a Series of Articles to Preselected Groups for Further Advance of the Groups. The present structure overcomes certain operating difficulties in the conveyor system of the previous application referred to.

General arrangement of conveyor

The conveyor system herein disclosed includes a delivery conveyor 1 which is adapted to receive bread from the cooler of a bakery. As is described in greater detail in the co-pending Hatch and McKim application the receiving conveyor 1 receives loaves of bread in successive groups of some 15 to 20 loaves each. Due to the capacity and speed of bakery coolers with which the conveyor system is designed to operate, the receiving conveyor 1 must operate at a speed in the neighborhood of 90 ft. per minute. At this or other approximate speed the groups or loaves will be separated on the receiving conveyor by a minimum interval of 5 to 6 ft. The delivery conveyor 1 is driven by a conveyor motor 2 and the same motor is connected to drive a selector conveyor 3 at the same lineal speed as the receiving conveyor. The driving connections to the conveyors may take various forms and in the example illustrated the motor 2 drives a chain 4 connected directly to the selector conveyor. The selector conveyor is in turn coupled to the delivery conveyor by a second chain 5. The end shaft 6 of the selector conveyor is journaled in adjacent parallel relation in a suitable framework 8 so that loaves of bread delivered from the end of the delivery conveyor are transferred to the end of the selector conveyor. In order to assist the transfer of the loaves from one conveyor to the other a driven roll 9 is positioned between the adjacent ends of the conveyors and driven from the delivery conveyor by a chain 10.

The selector conveyor 3 is supported upon a boom 11, the side members of which are pivotally supported on the selector conveyor drive shaft 6 as by the support plates 12 projecting from the ends of the boom. The swinging end of the boom 11 and the selector conveyor 3 are guided between upright columns 13 and partially supported by a cable 14 and counterweight 15. The counterweight 15 moves along one of the supporting columns 16 which supports a series of vertically spaced or tiered receiving conveyors 17. Five receiving conveyors designated 17a, 17b, 17c, 17d, and 17e are illustrated in the present example.

The receiving conveyors 17 are driven by a second motor 18 as will be described in greater detail presently and each receiving conveyor delivers to a separate forwarding conveyor 19. The forwarding conveyors 19 are separately designated 19a to e corresponding to the receiving conveyors and deliver to bread slicing machines one of which is indicated at 20. If desired one of the forwarding conveyors such as 19a may extend to a sorting or storage table (not illustrated) rather than to a slicing machine.

Bread slicing machines are presently capable of receiving loaves of bread at a lineal speed of approximately 25 ft. per minute so the forwarding conveyors 19 are driven by a motor 21 at approximately that speed. Since all of the forwarding conveyors operate at the same speed they may be driven from a single motor by the chain drive arrangement illustrated in Fig. 3 wherein a single chain 22 is trained around driving sprockets on the ends of the end shafts of the forwarding conveyors. Since the receiving conveyor 17 will receive bread at the rate of 90 lineal ft. per minute from the selector conveyor and deliver the bread to the forwarding conveyors operating at 25 ft. per minute, provision is made in the driving connection to the receiving conveyors to operate these conveyors at two different speeds as will be described in greater detail.

*Selector conveyor operation*

The selector conveyor 3 and boom 11 are adjusted between the several receiving conveyors by a mechanical system similar to the system disclosed in the aforementioned copending application. A hydraulic cylinder 23 having a piston rod 24 connected to the boom is adapted to raise and lower the swinging end of the boom. Fluid for operating the cylinder is supplied through the conduits 25 from a pump and valve structure enclosed in the case 26. The pump and valve are illustrated only conventionally in the control diagram in Fig. 7. One of the uprights or columns 13 carried five switch assemblies 27a to e corresponding to each of the receiving conveyors. Each switch assembly 27 includes an actuating member 28 positioned to be engaged and depressed by a roller 29 carried on the side of the boom when the delivery end of the selector conveyor is in registering relation with the associated receiving conveyor. A transverse roller 30 is carried on the swinging end of the boom and driven from the selector conveyor by the chain 31 to assist in transferring loaves from the selector conveyor to the receiving conveyors. Mounted on the boom 11 is a bridge 32 carrying an electrical switch 33. The switch 33 is a three pole switch designed to make one contact and break another when actuated and the switch is controlled by a trigger arm 34 extending forwardly and downwardly from the switch toward the delivery end of the selector conveyor. When loaves of bread are passing from the end of the selector conveyor as shown in Fig. 4 the switch 33 will be in one position. As the last loaf of a group of loaves has reached the selector conveyor the trigger 34 falls and the switch 33 will be moved to its alternate position.

*Receiving conveyor drive*

As was briefly referred to previously, the receiving conveyors 17 are operated at two different speeds at different intervals in their cycle of operation. The mechanism for obtaining these two different speeds is best illustrated in Figs. 1 and 2. The drive shafts 35 of the receiving conveyors project from their supporting bearings 36 through a magnetic clutch 37 and an overrunning clutch 38. It will be understood that a clutch of each type is provided on the drive shaft of each of the receiving conveyors. The overrunning clutch 38 includes a drive member 39 having a relatively large sprocket 40. The sprocket 40 is continuously driven at constant speed from the motor 18 and chain 41. The several sprockets 40 and driving members 39 operate at a relatively slow speed corresponding to the 25 ft. per minute speed of the receiving conveyors. The overrunning clutches include a driving housing 42 surrounding a driven member 43 keyed to the shaft as at 44. Rockable locking members 45 are adapted to lock the driving and driven members together and drive the shaft at the same speed as the sprocket 40 when the shaft is not otherwise driven at a higher rate of speed. Other forms of overrunning clutches can obviously be substituted for the assembly illustrated.

The magnetic clutch 37 includes a relatively small sprocket 46 driven at a relatively high rate of speed corresponding to the 90 ft. per minute speed of the receiving conveyors. The several sprockets 46 are driven from the motors 18 by a chain 461. The sprocket 46 is freely rotatable on the shaft 35 and carries a driving clutch plate 47. A driven clutch member 48 is keyed to the shaft 35 as at 49 and is axially slidable thereon. A relatively stationary housing 50 encloses an electrical coil which when energized will magnetically attract the driven clutch member 48 into engagement with the driving clutch member 47. Various forms of magnetic clutches may be substituted for the form generally described herein.

It will be apparent that when the magnetic clutch 37 of any particular receiving conveyor is energized that conveyor will operate at a high speed equal to the speed of the selector conveyor 3. Bread will then travel from the selector conveyor to the receiving conveyor without abrasion or damage to the bread. If the magnetic clutch associated with a particular receiving conveyor is de-energized immediately upon completion of delivery of a group of loaves to that receiving conveyor, the high speed drive to the receiving conveyor is disconnected and the overrunning clutch 38 of the slow speed drive will pick up the conveyor shaft and continue to drive the receiving conveyor at slow speed. By making the receiving conveyors 17 of sufficient length it is possible to receive a complete group of loaves in the conveyor at a high speed and then slow down the conveyor for delivery at slow speed to the forwarding conveyors before the group of loaves reaches the forwarding conveyors. Since the selector conveyor moves on to a succeeding receiving conveyor after delivering each group of loaves there is ample time for each receiving conveyor to discharge one group of loaves at slow speed before being called upon to receive a second group of loaves at high speed.

All of the conveyors of the system are desirably of linked rod construction in which a plurality of cross-rods 51 are bent into U-shape and provided with loops 52 at their ends engaged around the cross-bar of a preceding rod. Such conveyors are not new but it is a feature of the present conveyor system that the looped ends 52 of the conveyors are slidably supported on nylon bearing strips 53 which smoothly support the conveyors and permit their movement without noise and without wear. The nylon strips are supported on the framework of the conveyors which heretofore was in direct contact with the bars of the conveyors.

*Control system*

The control system for regulating the operation of the conveyors is illustrated conventionally in Fig. 7. The pump for driving the hydraulic cylinder 23 is indicated at 54 and is continuously operated whenever the solenoid 55 and associated switch 56 are energized. Manual switches 57 for controlling the solenoid 55 are provided and alternate overload switches such as are illustrated at 58 may be provided. A solenoid 59 mechanically connected to actuate a valve 60 is provided for controlling the upward movement of the piston rod 24 while a second solenoid 61 with a mechanically associated valve 62 is provided for controlling a downward movement of the piston rod and selector boom. The motor 2 which drives the delivery conveyor and selector conveyor is controlled by a switch 63 having an operating solenoid 64.

The solenoid 59 which initiates upward movement of the boom is connected to be energized through a switch 65 closed in the energized condition of a solenoid 66 which may thus be designated as the up control solenoid. The solenoid 61 which initiates downward movement of the boom is connected to be energized through the switch 67 closed in the energized condition of a solenoid 68 which may thus be described as the down control solenoid. Power for actuating the entire control system is delivered from an alternating current power source 69 through the transformer 70. One side of the output circuit of the transformer is designated by a heavy black line 71 and the switches 65 and 67 each connect to this wire through the wire 72.

The up control solenoid 66 and the down control solenoid 68 are energized from the trigger switch 33 in the lowered position of that switch which connects the switch 73 and a time delay solenoid 74 to the wire 71. The time delay solenoid 74 is adjusted to require an interval of 2 to 3 seconds before opening the switch 73 and during this interval the wire 75 is energized. One branch of the wire 75 extends to the normally closed contact of a switch 76 actuated by the up control solenoid 66 and in turn connected to the wire 77 and down control solenoid 68. Thus when the up control solenoid 66 is energized the down control solenoid 68 cannot be energized. The other branch of the wire 75 extends through a normally closed switch 78 controlled by the down control solenoid 68 and from there through a wire 79 to the up control solenoid. Energization of the down control solenoid thus prevents simultaneous energization of the up control solenoid.

A holding circuit for the up control solenoid 66 is closed from the wire 72 and normally open switch 80 to the wire 75 when the up control solenoid is initially energized. A second holding circuit for the down control solenoid 68 is closed from the wire 72 by the normally open switch 81 to the wire 75 when the down control solenoid is initially energized. It is apparent that each time the trigger switch 33 is lowered either the up control solenoid or the down control solenoid will be energized and that the actuated solenoid will close its own holding circuit and remain energized in spite of subsequent opening of the switch 73 by the time delay solenoid 74.

The selection of the up control solenoid or the down control solenoid for actuation is under the control of the return circuits of these solenoids. The return circuit of the up control solenoid 66 extends through the wire 82 to one side of the switch 83 which forms part of the boom controlled switch 27e associated with the lowermost tier of the receiving conveyors. The return circuit of the down control solenoid is connected through the wire 84 to one side of the switch 85. The switch 85 forms a second portion of the switch assembly 27e and is mechanically coupled to the switch 83. The switches 83 and 85 are opened or moved away from the wires 82 and 84 as illustrated in Fig. 7 when the boom is in registry with the lower tier of the conveyor system.

The other boom actuated switch assemblies 27d to a are connected in series with the switches 83 and 85 and are designated on the circuit diagram as 86, 87, 88, 89, 90, 91, 92 and 93. Each of the switches 83 and 85 to 91 and 93 is bridged by a vacuum tube relay and the relays are designated 94, 95, 96, 97, 98, 99, 100 and 101. The vacuum tube relays are adapted to pass current and therefore bridge the switch with which they are associated whenever the heaters of the relays have been energized for a sufficient period of time.

With the boom in lowered position and with the boom controlled switch 85 open from the wire 84 as illustrated it is apparent that the return circuit to the down control solenoid 68 is broken and it is impossible for the boom to move downwardly from this initial position. While the return circuit from the up control solenoid through the wire 82 is broken by the raised position of switch 83 the heater of the vacuum tube relay 94 is energized through the wire 102 to the raised position of switch 83 and from thence through the closed series of switches 86, 88, 90 and 92 to the return wire 103 of the control system. Thus when the trigger switch 33 falls behind a group of loaves of bread delivered to the lower tier 17e the up control valve 60 will be actuated to start the boom moving upwardly. As the boom moves away from switches 83 and 85 these switches will close on the wires 82 and 84 but the down control solenoid 68 cannot be energized because its circuit is then broken at the switch 76 by the up control solenoid. The boom will continue its upward travel so long as the return circuit through the wire 82 is complete. As the boom reaches the second tier and switch assembly 27d the switch 86 is opened and this might break the circuit to the up control solenoid depending upon the condition of the vacuum tube relay 96 associated with the switch 86. In the present instance the heater of the relay 96 is connected through a wire 104 and a manually adjustable switch 105 and a wire 106 extending to the switch 83 which was closed while the boom was at the lower level. Thus while vacuum tube relay 96 is deenergized upon initial movement of the boom its terminals remain sufficiently heated to conduct current as the boom passes the second tier 17d and the boom continues to the third tier opening the switch 88 in the return circuit of the up control solenoid. The vacuum tube relay 98 associated with the switch 88 has its heater connected through a wire 107 to a second manually controlled switch 108 and in the present instance the circuit is broken by the switch 108 so vacuum tube relay 98 is de-energized and inoperative and opening of the switch 88 breaks the circuit to the up control relay 66 opening solenoid controlled switch 65 and stopping upward movement of the boom at the third tier 17c.

During upward movement of the boom 11 the selector conveyor 3 has continued to operate and a second group of loaves will be approaching the trigger switch 33 to raise this switch into contact with a wire 109 extending to a fourth solenoid 110 which may be designated as a straggler control solenoid. Simultaneously the circuit to the time delay solenoid 74 and the switch 73 is broken reconditioning the initial energizing circuits to the solenoids 66 and 68 for further or successive operation. Energization of the straggler control solenoid 110 opens a switch 111 in the power supply wire 112 to the solenoid 64 controlling the conveyor motor 2 but since the solenoid 64 is energized through a normally closed switch 113 of the down control solenoid and the normally closed switch 65 of the now deenergized up control solenoid 66 the conveyor continues to operate.

The next succeeding closing of the trigger switch 33 on the time delay switch 73 will energize a second upward movement of the boom 11 and it is pointed out that this movement is permitted and required because the heater of the vacuum tube relay will be energized and the relay rendered conductive by opening of the switch 88 when the boom reaches the third tier. The energizing circuit to the heater of the relay 98 extends through the wire 107 and switch 108 to the wire 114 that is engaged by the switch 88 in the raised position of the latter switch.

The control circuit includes other manually controlled switches 115, 116, 117 and 118 that are ganged together with the switches 105, 108 to selectively control the sequence of movement of the boom between the several tiers of the conveyor system. A detailed tracing of the circuits through all adjusted positions of the boom and the selector switches is believed to be unnecessary to a complete understanding of the operation of the circuit. It is pointed out that when the boom has reached the upper tier 17a and opened switches 92 and 93 a successive actuation of the trigger switch 33 cannot re-energize the up control solenoid 66 because there is no vacuum tube relay bridging the switch 92 and the return circuit from the relay 66 is broken at that point. When the boom is fully raised the switches 85, 87, 89 and 91 will all be closed on the return circuit 84 of the down control solenoid 68 and the heater of the vacuum tube relay 101 being continuously energized through the wire 119, the return circuit to the down control solenoid will be complete to start downward motion of the boom. In the present arrangement the boom is arranged to return directly from the upper tier all the way to the bottom tier.

The magnetic switches 37a to d which engage the high speed drives of the receiving conveyors are provided with a direct current source of power 120 and are individually controlled by solenoid control switches actuated by the solenoids 121, 122, 123, and 124. These solenoids are connected as shown to the switches 85, 87, 89 and 91 to be closed when the boom is in registry with the corresponding tier of the receiving conveyors. Thus during the interval that each tier is receiving a group of loaves of bread from the selector conveyor that receiving conveyor will operate at the same high speed as the selector and delivery conveyors.

The function of the straggler control solenoid 110 and its switch 111 is to prevent unintentional actuation and cycling of the control system by a single article or loaf of bread which may become separated from its group and re-actuate the trigger 34 and trigger switch 33 after the switch 33 has started an advancing motion of the boom 11. It is pointed out that while the boom is in motion due to energization of either the up control solenoid 66 or the down control solenoid 68 the circuit to the solenoid 64 controlling the conveyor motor is broken by either the switch 113 or the switch 65. Therefore opening of the switch 111 by a straggler loaf will de-energize the solenoid 64 and stop the conveyor to prevent the straggler loaf from being fed off the end of the moving boom. After the boom reaches its new station and the solenoids 66 and 68 are de-energized the conveyor will be re-started and move the straggler loaf from underneath the trigger 34 onto the receiving conveyor at the new station. It is pointed out that movement of the straggler loaf from under the trigger 34 will cause an immediate closing of the switch 33 and would normally signal and initiate an immediate succeeding movement of the boom before the normal supply of bread was delivered to the station. However, the circuits to the heaters of the vacuum tube relays prevent any such premature cycling of the control system. It is pointed out that the control system and the boom come to a stop in each case because of opening of one of the boom actuated switches which is not bridged by a heated vacuum tube relay. The heaters of the vacuum tube relays require substantial time to become heated before reconditioning the return circuits from the solenoids 66 and 68 and before the vacuum tube relay in circuit with the up or down control solenoid can become effective to pass current and initiate an unwanted cycle the following group of loaves will have re-opened the trigger switch 33 and the succeeding groups will be divided equally between the several tiers of the receiving conveyor as determined by the settings of the selector switches.

Having thus described the invention, what is claimed to be new and is desired to be secured by Letters Patent is:

1. A conveyor system comprising a delivery conveyor operated at a relatively high speed and adapted to receive and advance groups of articles at spaced intervals therealong, a plurality of distributing conveyors driven at a relatively slow speed and each having one end positioned in vertically spaced tiered relation to the other distributing conveyors, a plurality of receiving conveyors each having one end in registering relation with one of said distributing conveyors and its other end positioned in vertically spaced tiered relation to the other receiving conveyors, a selector conveyor having one end pivoted in registering relation to the end of said delivery conveyor, means for swinging the other end of said selector conveyor into registering relation with said other ends of said receiving conveyors, means connected to drive said selector conveyor at about the same speed as said delivery conveyor, means including overrunning clutches connected to drive each receiving conveyor at about the same speed as said distributing conveyors, means including magnetically shiftable clutch elements mounted and connectable to independently drive each receiving conveyor at about the same speed as said selector conveyor, and control means connected to individually actuate said shiftable clutch elements to drive the receiving conveyor associated with the actuated clutch element when said selector conveyor is in registry with the receiving conveyor of the actuated clutch element, said receiving conveyors being longer than the groups of articles advanced by said delivery conveyor.

2. A conveyor system comprising a delivery conveyor operated at a relatively high speed and adapted to receive and advance groups of articles at spaced intervals therealong, a plurality of distributing conveyors driven at a relatively slow speed, a plurality of receiving conveyors each having one end in registering relation with one of said distributing conveyors and its other end positioned in vertically spaced tiered relation to the other receiving conveyors, a selector conveyor having one end pivoted in registering relation to the end of said delivery conveyor, means for swinging the other end of said selector conveyor into registering relation with said other ends of said receiving conveyors, means connected to drive said selector conveyor at about the same speed as said delivery conveyor, means connectable to each receiving conveyors to drive said receiving conveyors at about the same speed as said distributing conveyors, means including shiftable clutch elements mounted and connectable to independently drive said receiving conveyors at about the same speed as said selector conveyor, and control means connected to individually actuate said shiftable clutch elements to drive the receiving conveyor associated with the actuated clutch element when said selector conveyor is in registry with the receiving conveyor of the actuated clutch element, said receiving conveyors being longer than the groups of articles advanced by said delivery conveyor.

3. In combination with a conveyor assembly having a delivery conveyor and a swingable selector conveyor at the end of the delivery conveyor swingable into registry with the ends of a plurality of receiving conveyors, a control system for said assembly comprising, a motor connected to drive said selector conveyor, moving means connected to swing said selector conveyor, a first drive means connected to drive said receiving conveyors at a slower speed than said selector conveyor, a second drive means connected to independently drive said receiving conveyors at about the same speed as said selector conveyor, a plurality of tier switches each positioned to be actuated by said selector conveyor when said selector conveyor is in registry with a different one of said receiving conveyors, a trigger switch positioned to be moved between two positions by the presence or absence of articles on the delivery end of said selector conveyor, an electrically actuated up control element connected to energize said moving means to move said selector conveyor upwardly, an electrically actuated down control element connected to energize said moving means to move said selector conveyor downwardly, a first solenoid switch connected to energize said up control element and having a controlling up control solenoid, a second solenoid switch connected to energize said down control element and having a controlling down control solenoid, a movement control circuit including said trigger switch and a time delay switch in series, said movement control circuit having branches extended to energize said up and down control solenoids and each branch including a switch closed in the de-energized condition of the other solenoid than that which the branch circuit is connected to energize, continuation return circuits connected from said branch circuits through banks of said tier switches in series, vacuum tube relays bridging part of said tier switches, manually adjustable switch circuits connected to selectively energize said vacuum relays to render the same conductive in varying adjusted positions of said selector conveyor to continue said return circuits as selected tier switches are opened, a time delay solenoid connected to be energized from said movement control circuit and disposed to open said time delay switch, a motor control switch connected to actuate said motor and having a controlling motor control solenoid, a circuit connected to energize said motor control solenoid and including in series a pair of switches operated by said up and down control solenoids and closed in the de-energized condition of said latter solenoids, an alternate circuit connected to independently energize said motor control solenoid and including a solenoid operated switch, a straggler control solenoid arranged to actuate said last solenoid switch and connected to be energized by said trigger switch in the raised condition thereof corresponding to the condition of an article on said selector conveyor actuating said trigger switch and a plurality of switches connected to actuate said second drive means to said receiving conveyors and positioned to be closed when said selector conveyor is in registry with the receiving conveyor associated with each of said last switches.

4. In combination with a conveyor assembly having a delivery conveyor and a swingable selector conveyor at the end of the delivery conveyor swingable into registry with the ends of a plurality of receiving conveyors, a control system for said assembly comprising, a motor connected to drive said selector conveyor, moving means connected to swing said selector conveyor, a plurality of tier switches each positioned to be actuated by said selector conveyor when said selector conveyor is in registry with a different one of said receiving conveyors, a trigger switch positioned to be moved between two positions by the presence or absence of articles on the delivery end of said selector conveyor, an electrically actuated up control element connected to energize said moving means to move said selector conveyor upwardly, an electrically actuated down control element connected to energize said moving means to move said selector conveyor downwardly, a first solenoid switch connected to energize said up control element and having a controlling up control solenoid, a second solenoid switch connected to energize said down control element and having a controlling down control solenoid, a movement control circuit including said trigger switch and a time delay switch in series, said movement control circuit having branches extended to energize said up and down control solenoids and each branch including a switch closed in the de-energized condition of the other solenoid than that which the branch circuit is connected to energize, continuation return circuits connected from said branch circuits through banks of said tier switches in series of said tier switches, vacuum tube relays bridging part of said tier switches, manually adjustable switch circuits connected to selectively energize said vacuum relays to render the same conductive in varying adjusted positions of said selector conveyor to continue said return circuits as selected tier switches are opened, a time delay solenoid connected to be energized from said movement control circuit and disposed to open said time delay switch, a motor control switch connected to actuate said motor and having a controlling motor control solenoid, a circuit connected to energize said motor control solenoid and including in series a pair of switches operated by said up and down control solenoids and closed in the de-energized condition of said latter solenoids, an alternate circuit connected to independently energize said motor control solenoid and including a solenoid operated switch, and a straggler control solenoid arranged to actuate said last solenoid switch and connected to be energized by said trigger switch in the raised condition thereof corresponding to the condition with an article on said selector conveyor.

5. In combination with a conveyor assembly having a delivery conveyor and a swingable selector conveyor at the end of the delivery conveyor swingable into registry with the ends of a plurality of receiving conveyors, a control system for said assembly comprising, a motor connected to drive said selector conveyor, moving means connected to swing said selector conveyor, a first drive means connected to drive said receiving conveyors at a slower speed than said selector conveyor, a second drive means connected to independently drive said receiving conveyors at about the same speed as said selector conveyor, a plurality of tier switches each positioned to be actuated by said selector conveyor when said selector conveyor is in registry with a different one of said receiving conveyors, a trigger switch positioned to be moved between two positions depending upon the presence or absence of articles on the delivery end of said selector conveyor, an electrically actuated up control element connected to energize said moving means to move said selector conveyor upwardly, an electrically actuated down control element connected to energize said moving means to move said selector conveyor downwardly, a first solenoid switch connected to energize said up control element and having a controlling up control solenoid, a second solenoid switch connected to energize said down control element and having a controlling down control solenoid, a movement control circuit including a trigger switch and a time delay switch in series, said movement control circuit having branches extended to energize said up and down control solenoids and each branch including a switch closed in the de-energized condition of the other solenoid than that which the branch circuit is connected to energize, continuation return circuits connected from said branch circuits through banks of said tier switches in series, delayed closing switches bridging part of said tier switches in each bank, manually adjustable switch circuits connected to selectively energize said delayed closing switches to render the same conductive in varying adjusted positions of said selector conveyor to continue said return circuits as selected tier switches are opened, a time delay solenoid connected to be energized from said movement control circuit and disposed to open said time delay switch, a motor control switch connected to actuate said motor and having a controlling motor control solenoid, a circuit connected to energize said motor control solenoid and including in series a pair of switches operated by said up and down control solenoids and closed in the de-energized condition of said latter solenoids, an alternate circuit connected to independently energize said motor control solenoid and including a solenoid operated switch, a straggler control solenoid arranged to actuate said last solenoid switch and connected to be energized by said trigger switch in the raised condition thereof corresponding to the condition existing with an article on said selector conveyor in contact with the trigger switch and a plurality of switches connected to actuate said second drive means to said receiving conveyors and positioned to be closed when said selector conveyor is in registry with the receiving conveyor associated with each of said last switches.

6. In combination with a conveyor assembly having a delivery conveyor and a swingable selector conveyor at the end of the delivery conveyor swingable into registry with the ends of a plurality of receiving conveyors, a control system for said assembly comprising, a motor connected to drive said selector conveyor, moving means connected to swing said selector conveyor, a plurality of tier switches each positioned to be actuated by said selector conveyor when said selector conveyor is in registry with a different one of said receiving conveyors, a trigger switch positioned to be moved between two positions by the presence or absence of artcles on the delivery end of said selector conveyor, an electrically actuated up control element connected to energize said moving means to move said selector conveyor upwardly, an electrically actuated down control element connected to energize said moving means to move said selector conveyor downwardly, a first solenoid switch connected to energize said up control element and having a controlling up control solenoid, a second solenoid switch connected to energize said down control element and having a controlling down control solenoid, a movement control circuit including said trigger switch and a time delay switch in series, said movement control circuit having branches extended to energize said up and down control solenoids and each branch including a switch closed in the de-energized condition of the other solenoid than that which the branch circuit is connected to energize, continuation return circuits connected from said branch circuits through banks of said tier switches in series, delayed closing switches bridging part of the tier switches, manually adjustable switch circuits connected to selectively energize said delayed closing switches to render the same conductive in varying adjusted positions of said selector conveyor to continue said return circuits as selected tier switches are opened, a time delay solenoid connected to be energized from said movement control circuit and disposed to open said time delay switch, a motor control switch connected to actuate said motor and having a controlling motor control solenoid, a circuit connected to energize said motor control solenoid and including in series a pair of switches operated by said up and down control solenoids and closed in the de-energized condition of said latter solenoids, an alternate circuit to independently energize said motor control solenoid and including a solenoid operated switch, and a straggler control solenoid arranged to actuate said last solenoid switch and connected to be energized by said trigger switch in the raised condition thereof corresponding to the condition existing with an article on said selector conveyor in contact with said trigger switch.

7. In combination with a conveyor assembly having a delivery conveyor and a swingable selector conveyor at the end of the delivery conveyor swingable into registry with the ends of a plurality of receiving conveyors, a control system for said assembly comprising, a motor connected to drive said selector conveyor, moving means connected to swing said selector conveyor, a first drive means connected to drive said receiving conveyors at a slower speed than said selector conveyor, a second drive means connected to independently drive said receiving conveyors at about the same speed as said selector conveyor, a plurality of tier switches each positioned to be actuated by said selector conveyor when said selector conveyor is in registry with a different one of said receiving conveyors, a trigger switch positioned to be moved to closed position by the absence of articles on the delivery end of said selector conveyor, an electrically actuated up control element connected to energize said moving means to move said selector conveyor upwardly, an electrically actuated down control element connected to energize said moving means to move said selector conveyor downwardly, a first solenoid switch connected to energize said up control element and having a controlling up control solenoid, a second solenoid switch connected to energize said down control element and having a controlling down control solenoid, a movement control circuit including said trigger switch, said movement control circuit having branches extended to energize said up and down control solenoids and each branch including a switch closed in the de-energized condition of the other solenoid than that which the branch circuit is connected to energize, continuation return circuits connected from said branch circuits through banks of said tier switches in series, delayed closing switches bridging part of said tier switches, manually adjustable switch circuits connected to selectively energize said delayed closing switches to render the same conductive in varying adjusted positions of said selector conveyor to continue said return circuits as selected tier switches are opened, a circuit connected to energize said motor, and a plurality of switches connected to actuate said second drive means to said receiving conveyors and positioned to be closed when said selector conveyor is in registry with the receiving conveyor associated with each of said last switches.

8. In combination with a conveyor assembly having a delivery conveyor and a swingable selector conveyor at the end of the delivery conveyor swingable into registry with the ends of a plurality of receiving conveyors, a control system for said assembly comprising, a motor connected to drive said selector conveyor, moving means connected to swing said selector conveyor, drive means connected to drive said receiving conveyors at a slower speed than said selector conveyor, a plurality of tier switches each positioned to be actuated by said selector conveyor when said selector conveyor is in registry with a different one of said receiving conveyors, a trigger switch positioned to be moved to closed position by the absence of articles on the delivery end of said selector conveyor, a first electrically actuated advance control element connected to energize said moving means to move said selector conveyor in an advancing direction, an electrically actuated down control element connected to energize said moving means to move said selector conveyor in a retracting direction, a first solenoid switch connected to energize said advance control element and having a controlling advance control solenoid, a second solenoid switch connected to energize said retracting control element and having a controlling retracting control solenoid, a movement control circuit including said trigger switch, said movement control circuit having branches extended to energize said advance and retracting control solenoids and each branch including a switch closed in the de-energized condition of the other solenoid than that which the branch circuit is connected to energize, continuation return circuits connected from said branch circuits through banks of said tier switches in series, delayed closing switches bridging part of said tier switches, manually adjustable switch circuits connected to selectively energize said delayed closing switches to render the same conductive in varying adjusted positions of said selector conveyor to continue said return circuits as selected tier switches are opened, and a circuit connected to energize said motor.

9. A conveyor system comprising, a delivery conveyor, means for driving said delivery conveyor, means for delivering groups of adjacent articles to said delivery conveyor at spaced intervals therealong, a selector conveyor having one end pivotally supported adjacent the end of said delivery conveyor to receive articles therefrom, a plurality of receiving conveyors arranged in tiers with one end of each receiving conveyor positioned adjacent the path of the swinging end of said selector conveyor to receive articles therefrom, moving means for swinging said selector conveyor between said receiving conveyors, a switch positioned to be actuated by the presence of articles adjacent the delivery end of said selector conveyor, a plurality of switches each positioned to be opened by movement of said selector conveyor into registry with a different one of said receiving conveyors, a control circuit connected to actuate said moving means and including said first switch and said plurality of switches in series, and a plurality of time delay switches bridging the individual switches of said first plurality of switches, said time delay switches being connected to be activated by movement of said selector conveyor into registry with the receiving conveyor with which the time delay switch is associated but remaining non-conductive for a substantial period of time after actuation whereby stray articles moving on said selector conveyor separately from the groups of articles thereon will not initiate swinging movement of said selector conveyor.

References Cited in the file of this patent
UNITED STATES PATENTS

| | | |
|---|---|---|
| 959,996 | Cole | May 31, 1910 |
| 1,809,456 | Streeter | June 9, 1931 |
| 1,949,281 | Moore | Feb. 27, 1934 |